UNITED STATES PATENT OFFICE.

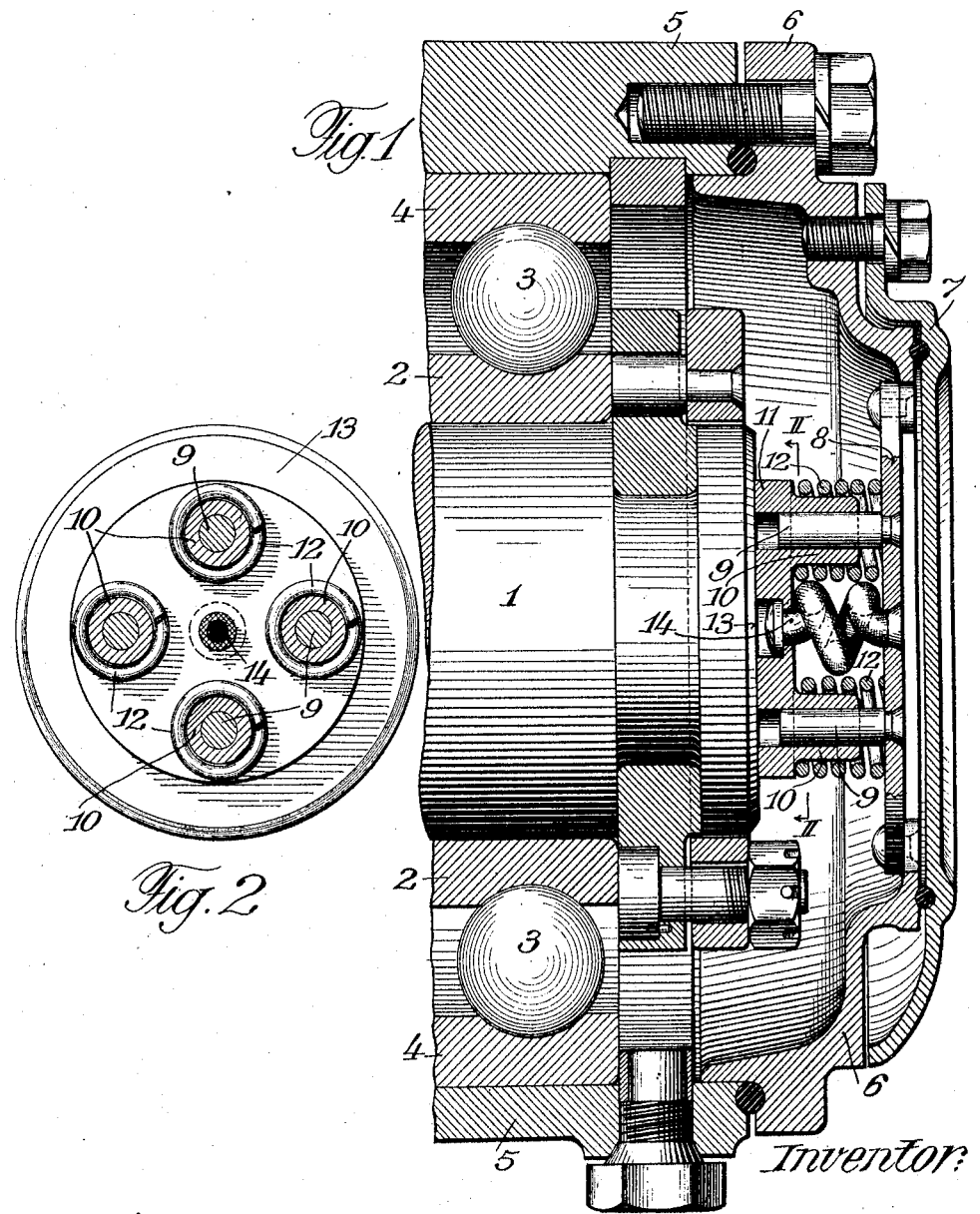

JAKOB SCHMID-ROOST, OF OERLIKON, NEAR ZURICH, SWITZERLAND.

ELECTRIC-CURRENT-TRANSMISSION DEVICE.

1,411,939.  Specification of Letters Patent.  Patented Apr. 4, 1922.

Application filed November 1, 1921. Serial No. 512,067.

*To all whom it may concern:*

Be it known that I, JAKOB SCHMID-ROOST, a citizen of the Republic of Switzerland, residing at Oerlikon, near Zurich, Switzerland, have invented a certain new and useful Improvement in Electric-Current-Transmission Devices, of which the following is a specification, reference being had therein to the accompanying drawing.

The present invention relates to improvements in electric railways and particularly to a current transmitting device for ball-bearings fitted to electrically driven vehicles running on rails.

With electrically driven vehicles running on rails and provided with ball-bearings the passage of the current from the bearing casing to the axle through the balls exerts a detrimental effect upon the ball bearings as the resistance at the point of contact of the balls with the ball races is comparatively high, thus causing a considerable heating up of the bearing parts, a decomposition of the lubricant and injuriously affecting the hardness of the balls. Experiments made with a view to transmitting the current from the bearing housing to the axle by means of wiper contacts did not result in any durable constructions, because a resilient member had to be employed for transmitting the current.

The object of the present invention is a device for transmitting current for the ball bearings in electrically driven vehicles running on rails with wiper contacts at the end of the axle, wherein a wiper contact plate pressed against the end face of the axle is electrically connected by means of a coiled cable to a second contact plate fixed to the axle bearing. By means of bolts and springs interposed between said contact plates one of said plates is guided relatively to the other.

A constructional example of the invention is shown on the accompanying drawing in which:

Fig. 1 is a longitudinal section and

Fig. 2 is a section along line II—II of Fig. 1.

1 denotes the end of an axle to which the inner ball race ring 2 is rigidly secured. 3 designates the balls and 4 is the outer ball race which is fixed in the housing 5 of the axle bearing. A cover ring 6 is screwed on to the housing 5 and a cover or lid 7 closes that ring and is secured to it. A contact plate 8 is fixed to the cover ring 6 and thereby to the housing 5. The plate 8 is provided with bolts 9 fixed thereto which are loosely guided in holes in nipples 10 of a wiper contact plate 11. Coil springs 12 surrounding the nipples 10 and the bolts 9 tend to force the contact plate 11 against the face 13 of the axle end 1.

To the contact plate 8 the one end of the core of a coiled insulated cable 14 is riveted and to the contact plate 11 the other end of the cable core is fixed. The cable 14 between its connecting points has a helicoidal twist enabling it to be compressed and extended similarly to coil springs.

Experiments have shown that the current transmitting device illustrated has an easy play in its axial direction and nevertheless a durable contact, since the springs are not used as current transmitters and are not subjected to torsional stresses by the rotation of the axle relatively to the bearing housing. The cable offers a very sound current transmitter.

I claim:

1. A current transmission device on the ball bearings of electrically driven vehicles running on rails, having in combination, a wiper contact plate adapted to be pressed against the end of the axle of the vehicle, a second contact plate secured to the housing of the bearing, means to press said wiper contact plate against the end of said axle, and a wound cable for the conductive connection between said contact plates.

2. A current transmission device on the ball bearings of electrically driven vehicles running on rails, having in combination, a wiper contact plate adapted to be pressed against the end of the axle of the vehicle, a second contact plate secured to the housing of the bearing, bolts fixed to the second contact plate, nipples arranged in the wiper contact plate for guiding said bolts, coil springs fitted about the nipples and bolts to press said wiper contact plate against the end of said axle, and a wound cable for the conductive connection between said contact plates.

3. A current transmission device on the ball bearings of electrically driven vehicles running on rails, having in combination, a wiper contact plate adapted to be pressed against the end of the axle of the vehicle, a second contact plate secured to the housing of the bearing, bolts fixed to the second contact plate, nipples arranged in the wiper contact plate for guiding said bolts, coil springs fitted about the nipples and bolts to press said wiper contact plate against the end of said axle, and a cable having a helicoidal twist the core of said cable being secured at one end to the centre of the wiper contact plate and at the other end to the centre of the other contact plate.

In testimony whereof I affix my signature.

JAKOB SCHMID-ROOST.